(12) United States Patent
Rusconi et al.

(10) Patent No.: US 8,726,936 B2
(45) Date of Patent: May 20, 2014

(54) COMPACT CARTRIDGE COUPLING

(75) Inventors: Paolo Rusconi, Rivolta D'Adda (IT);
Rocco Ferrara, Fara Gera D'Adda (IT)

(73) Assignee: Faster S.p.A., Milan (IT)

( * ) Notice: Subject to any disclaimer, the term of this patent is extended or adjusted under 35 U.S.C. 154(b) by 281 days.

(21) Appl. No.: 13/181,345

(22) Filed: Jul. 12, 2011

(65) Prior Publication Data

US 2012/0013120 A1    Jan. 19, 2012

(30) Foreign Application Priority Data

Jul. 16, 2010   (EP) .................................... 10425241

(51) Int. Cl.
*F16L 37/28*    (2006.01)

(52) U.S. Cl.
USPC ................................ 137/614.05; 137/614.04

(58) Field of Classification Search
USPC ........... 137/614.03–614.05; 251/149.1, 149.6
See application file for complete search history.

(56) References Cited

U.S. PATENT DOCUMENTS

| 4,598,896 | A | 7/1986 | Maldavs |
| 6,655,656 | B2 * | 12/2003 | Maldavs ................. 137/614.04 |
| 6,776,187 | B1 | 8/2004 | Marquis et al. |
| 6,926,031 | B2 * | 8/2005 | Zeiber et al. ............. 137/614.03 |
| 7,815,169 | B2 * | 10/2010 | Arosio ..................... 137/614.04 |

FOREIGN PATENT DOCUMENTS

| EP | 0038056 | 10/1981 |
| EP | 1058043 | 6/2000 |

* cited by examiner

*Primary Examiner* — Kevin Lee
(74) *Attorney, Agent, or Firm* — Stetina Brunda Garred & Brucker

(57) ABSTRACT

The present invention relates to a compact cartridge coupling of the type adapted to connect a pressurized fluid line between a vehicle or apparatus and a user, the coupling comprising a female semi-coupling adapted to receive a male semi-coupling and a decompression element adapted to moderate the pressure inside the female semi-coupling thus allowing a male under pressure to be coupled and allowing the male to be disconnected while leaving pressure in the user line, the cartridge coupling being further characterized by a 3:1 hydraulic unbalancing system between the pressure force acting on the female valve assembly and that acting on the male valve assembly.

6 Claims, 7 Drawing Sheets

COMPACT CARTRIDGE COUPLING

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a compact cartridge coupling.

Quick couplings according to ISO Standard 7241 are now consolidated on the international market, especially concerning the agricultural/forestry field. ISO standards regulate the sizes of the couplings in order to ensure the interchangeability of different manufacturers, the ability to be coupled and various minimum use requirements, such as pressure, capacity and so on.

Among the quick couplings according to the standard above, cartridge couplings are characterized by a compact design while maintaining the same functional principles of ISO Standard 7241.

In particular, cartridge couplings are inserted into a housing commonly made of cast iron in order to make the cartridge coupling employable with increased effectiveness where the operating conditions provide for high operating pressures, in particular also with sudden variations of the flow direction and particularly high pressure impulse frequencies.

Moreover, cartridge couplings are generally employed by positioning them inside the housings made of cast iron, for example, when the conditions of use provide for the presence of earth, mud and debris, such as precisely occurs in the case of uses in the agricultural and forestry field.

Therefore, one of the main drawbacks of the cartridge couplings known from the state of the art consists of the non-optimal reliability, with particular reference to the resistance and duration of the components and of the coupling as a whole, as well as to the need to act on a lever to activate internal mechanisms to implement the decompression and to facilitate the connection/disconnection.

Moreover, an improvable aspect of the cartridge couplings known from the state of the art consists in the overall volumes.

Therefore, it is the primary task of the present invention to suppress or reduce the above-mentioned drawbacks.

Therefore, it is the object of the present invention within the scope of this task to provide a quick cartridge coupling which is characterized by an overall reduced volume, so as to be arranged in narrow spaces, by mainly eliminating the volume of the decompression lever.

It is also a further object of the present invention to provide a quick cartridge coupling equipped with a decompression system which permits to moderate the pressure inside the system, thus reducing the coupling and uncoupling loads.

It is also an object of the present invention to provide a quick cartridge coupling equipped with a hydrostatically-balanced decompression system which allows the fluid, typically oil, to be decompressed both in the step of coupling and in the step of uncoupling by simply acting on the coupling without the aid of a lever.

Not last, it is an object of the present invention to provide a quick cartridge coupling which allows the male to be uncoupled thus leaving the latter under pressure after the disconnection.

This task and these and other objects which will become more apparent hereinafter are achieved by a cartridge coupling to connect a pressurized fluid line between a vehicle or apparatus and a user, comprising an external housing within which a female semi-coupling is inserted comprising a front valve assembly and adapted to receive a male semi-coupling, said housing comprising at least one recovery channel for the clean oil and one draining channel for the dirty oil, characterized in that it further comprises decompression means, on said female semi-coupling, to moderate the pressure inside the line thus facilitating the operations of coupling and uncoupling the male semi-coupling to/from said female semi-coupling.

The cartridge coupling according to the present invention is also characterized in that said decompression means comprise a hydrostatically-balanced decompression valve.

Again, the cartridge coupling according to the present invention is characterized in that it further comprises hydraulic blocking means adapted to prevent the front valve assembly from closing when the male coupling is inserted and regardless of the flow direction and pressure in the line, and adapted to allow the overtravel of said valve assembly required for the complete insertion of the male semi-coupling.

BRIEF DESCRIPTION OF THE DRAWINGS

Further features and advantages of the present invention will become more apparent from the following detailed description, provided by way of non-limiting example and illustrated in the accompanying drawings, in which.

DETAILED DESCRIPTION

According to a preferred embodiment of the present invention shown in the mentioned figures by way of a non-limiting example, the cartridge coupling 1 according to the present invention comprises an external housing 2, preferably made of cast iron or other suitable material, in which a female semi-coupling 3 is housed. Such a female semi-coupling is of the type adapted to receive a male semi-coupling 50, and is preferably of the type in accordance with the features established by ISO Standard 7241. Several conduits are obtained in said external housing 2, for the circulation of the fluid, generally oil, which runs through the hydraulic line on which the semi-couplings are inserted. In particular, with reference to FIG. 1, the fluid enters the main supply conduit of the line according to the arrow indicated by IN thus supplying the female semi-coupling 3 through the radial holes a1 and a2. The system then provides the collection of the dirty oil by means of a front draining channel included in housing 2 and indicated in FIG. 1 by the arrow OUT 1, while the clean oil is collected by means of a specific recovery channel OUT 2 for the clean oil, located in the rear part of housing 2, and put back into circulation.

Figure 6:
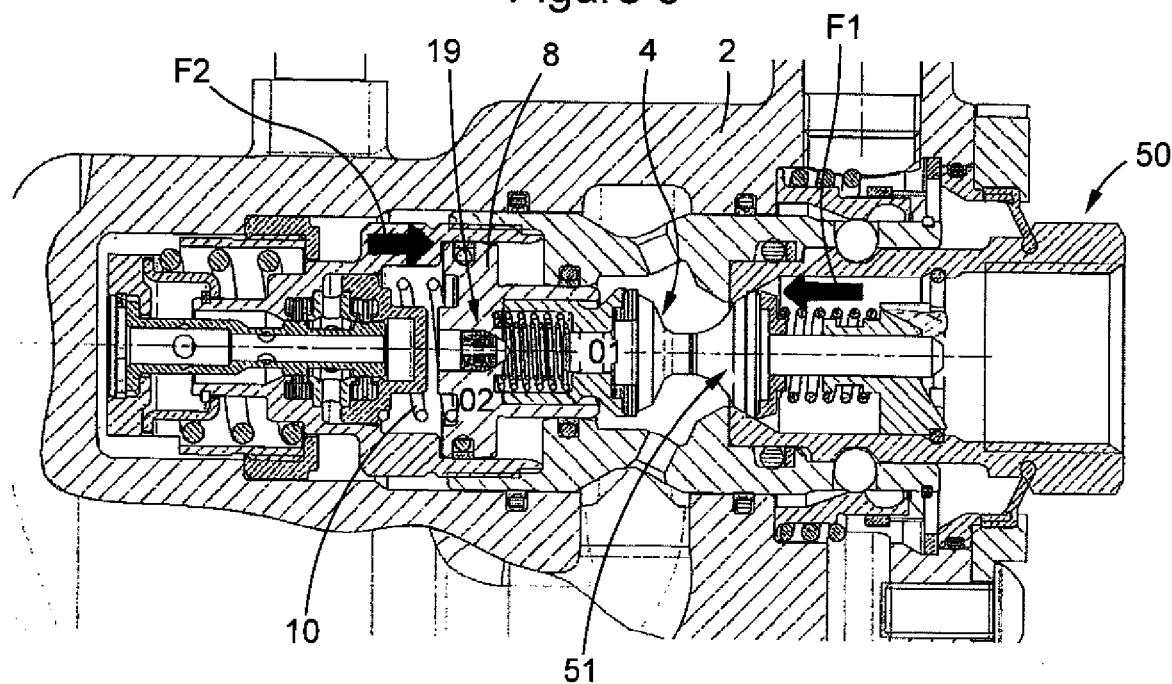
FIG. 6 shows the same view as FIG. 1 of the cartridge coupling according to the present invention with a male semi-coupling inserted and in an operating condition in which the valve of the male semi-coupling is closed.
Figure 7:
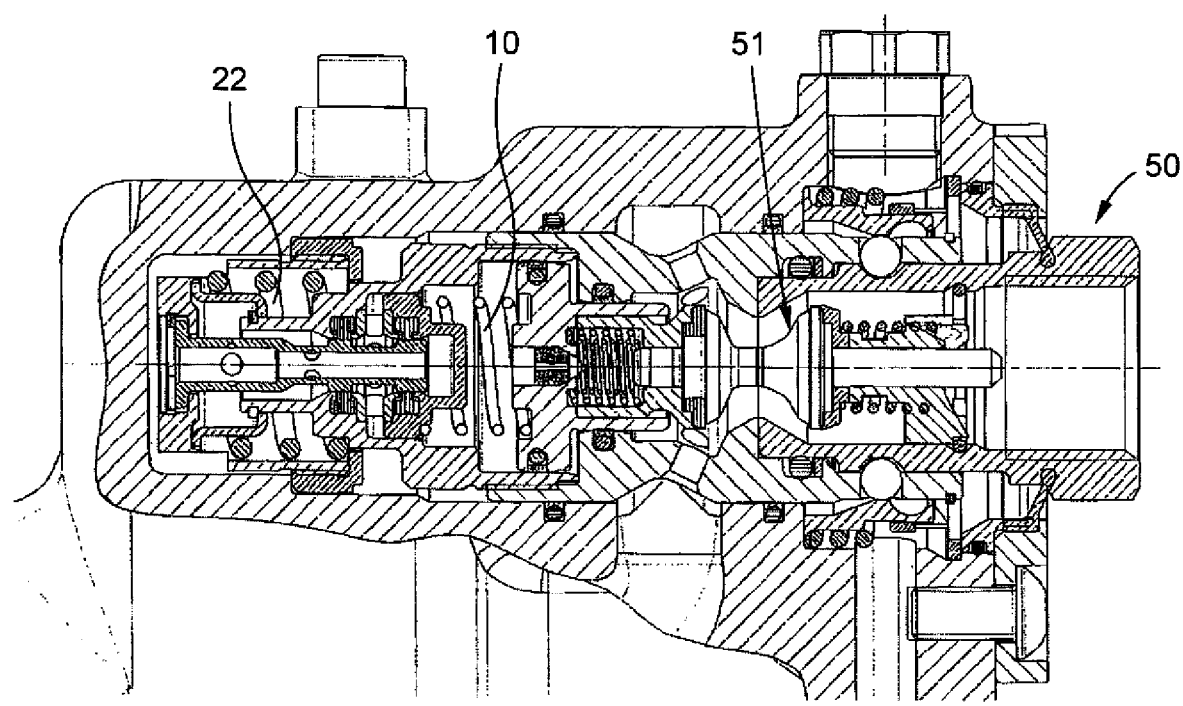
FIG. 7 shows the same configuration as FIG. 6 in which the user line is open.
Figure 8:
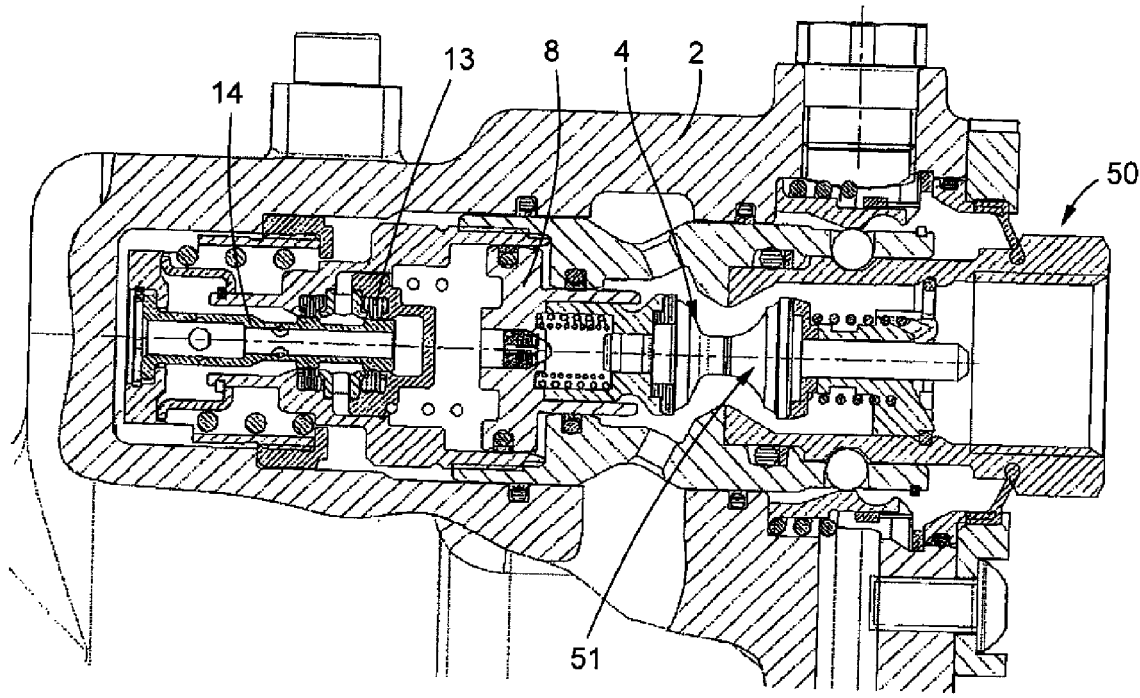
FIGS. 8 to 11 show the step of disconnecting the male semi-coupling from the female semi-coupling, for the cartridge according to the present invention.
Figure 9:
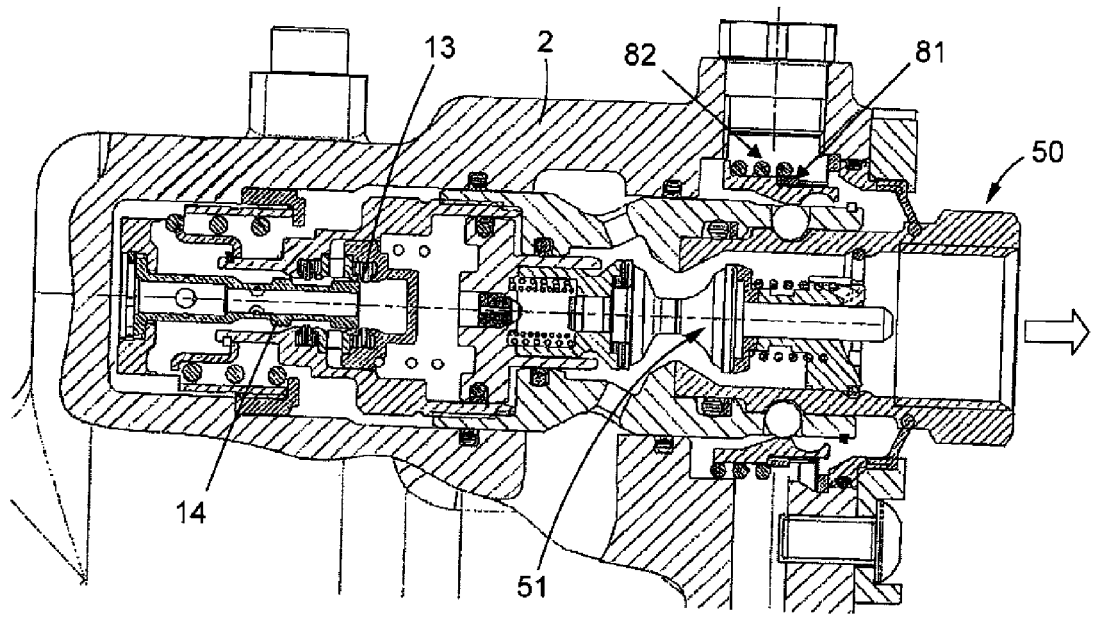

Said female semi-coupling 3 comprises a sliding ring nut 5 which is slidingly associated in longitudinal direction with respect to the external housing 2, and a ball set 6 is capable of axially translating with respect to the external housing 2. The ball set 6, by means of the balls 7, is capable of ensuring the connection of a male semi-coupling 50, as shown in FIGS. 6 and 7, as the balls 7 are capable of firmly keeping the male semi-coupling 50 as known in the field.

Figure 1:
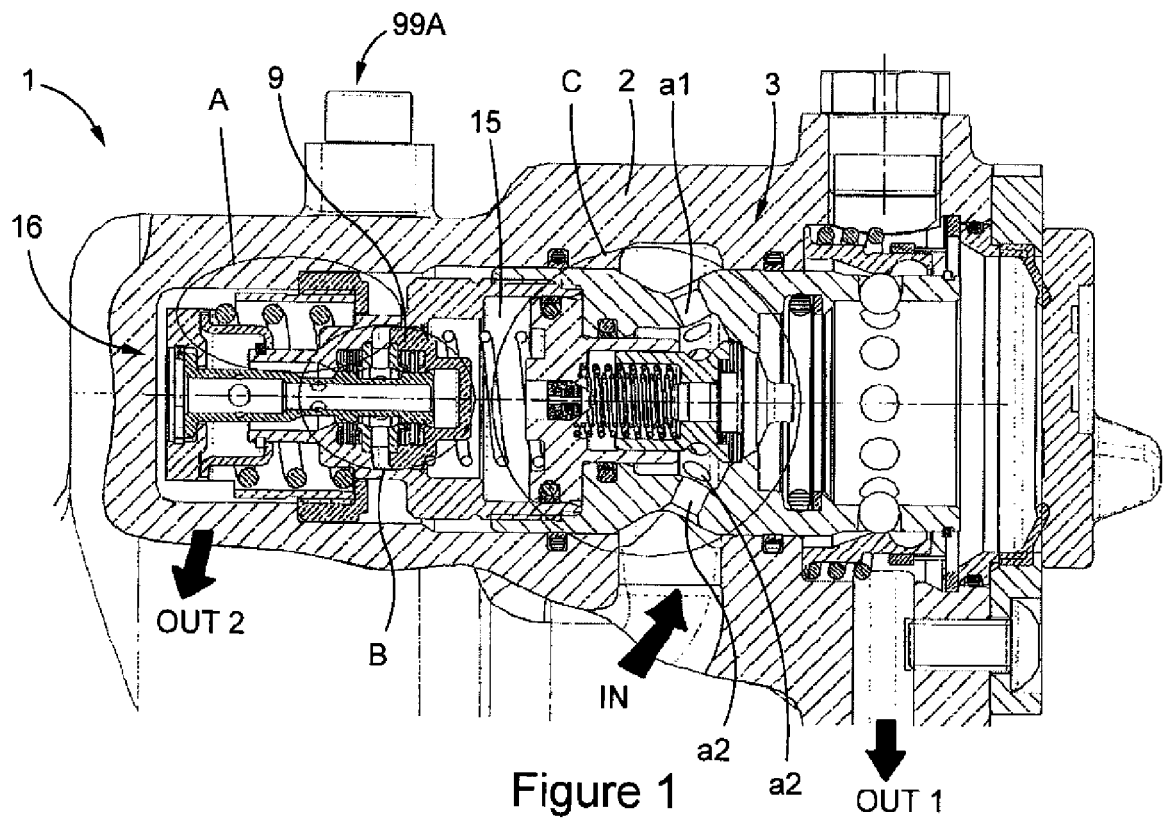
FIG. 1 shows a sectional view with a longitudinal plane of the cartridge coupling according to the present invention.
Figure 2:
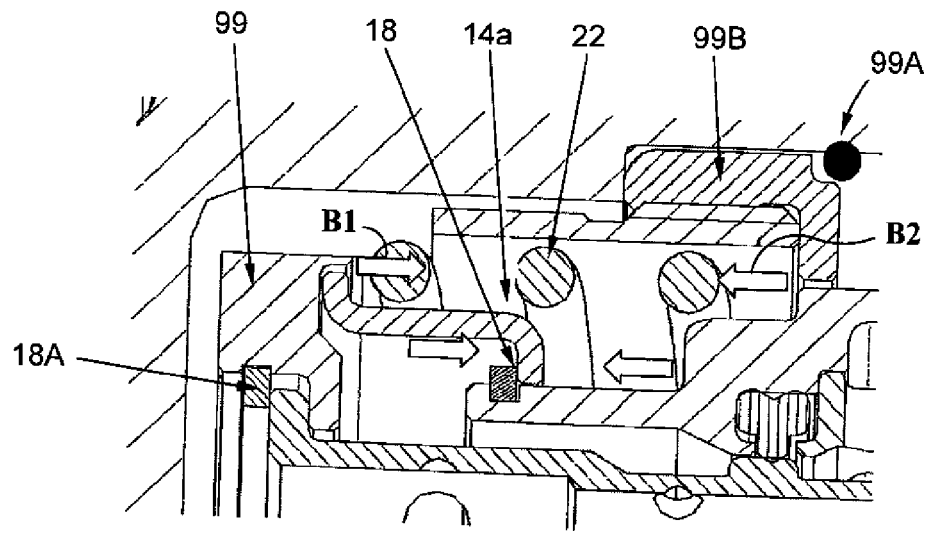
FIG. 2 shows an enlarged view of the detail indicated by A in FIG. 1, i.e. a detail of the resetting means.

The valve assembly 4, provided in a substantially axial position of the female semi-coupling 3, is capable of adhering to the walls of the internal clearance obtained inside the ball set 6 so as to close off the axial passageway to the fluid. As known again with reference to the accompanying figures, the input fluid from the main supply conduit according to the direction identified by the arrow IN reaches the area of the conduits a1 and a2 thus entering the female semi-coupling 3 until it reaches the ball set 4. As long as the male semi-coupling is not coupled, the ball set 4 closes the axial clearance of the female semi-coupling 3, as shown in FIG. 1. In this situation, the valve assembly 4 is pushed to close by the springs 15 and 16 and by the balancing slider 8.

The valve assembly 4 comprises a valve body 4a, equipped with a calibrated hole 20 adapted to put the interior of said valve body 4a in communication with the exterior, axially inserted into said balancing slider 8, more precisely inside an axial extension 8a of said balancing slider 8. Springs 15 and 16 act between said valve assembly 4 and said balancing slider 8, thus exerting a force which opposes the reciprocal nearing of the two components.

Again with particular reference to FIG. 1, a chamber 15 is present behind the valve assembly 4 and the balancing slider 8, which is filled with the pressurized fluid through the passageway given by the non-return valve 19 during the coupling operation. Said chamber is thus delimited by the balancing slider 8 and by the rear body 11, a second spring 10 acting between said rear body 11 and said balancing slider 8 by exerting a reaction force also in this case which opposes the reciprocal nearing of the two components.

An inner body 9 is provided inside said rear body 11 and integrally therewith, which is adapted to contain the movable equipment of the decompression valve (FIG. 3) generally indicated by the reference number 16.

Said decompression valve, placed in an axial position at the end opposite to the semi-coupling 3 with respect to the front valve assembly 4, comprises a decompression rod 14 and a couple of shaped gaskets 13, the two gaskets 13 being separated from each other by a spacer 13a, adapted to make the seal between said decompression rod 14 and said inner body 9 and said rear body 11, as better disclosed below.

The decompression valve 16 further comprises a balancing sliding bowl 14a which is slidingly associated with the exterior of said rear body 11 and the longitudinal travel of which is limited by a first elastic blocking ring 18. A second elastic blocking ring 18 prevents the axial movement of the decompression rod 14. The decompression valve is hydrostatically balanced as, by taking the enlargement in FIG. 3 as a reference, the resultants D1 and D2 of the forces due to the fluid pressure which are exerted on the decompression rod 14 are always balanced, which permits to remove the pressure inside the female semi-coupling 3 both in the step of coupling and in the step of uncoupling, with an effort independent of the pressure.

Figure 4:
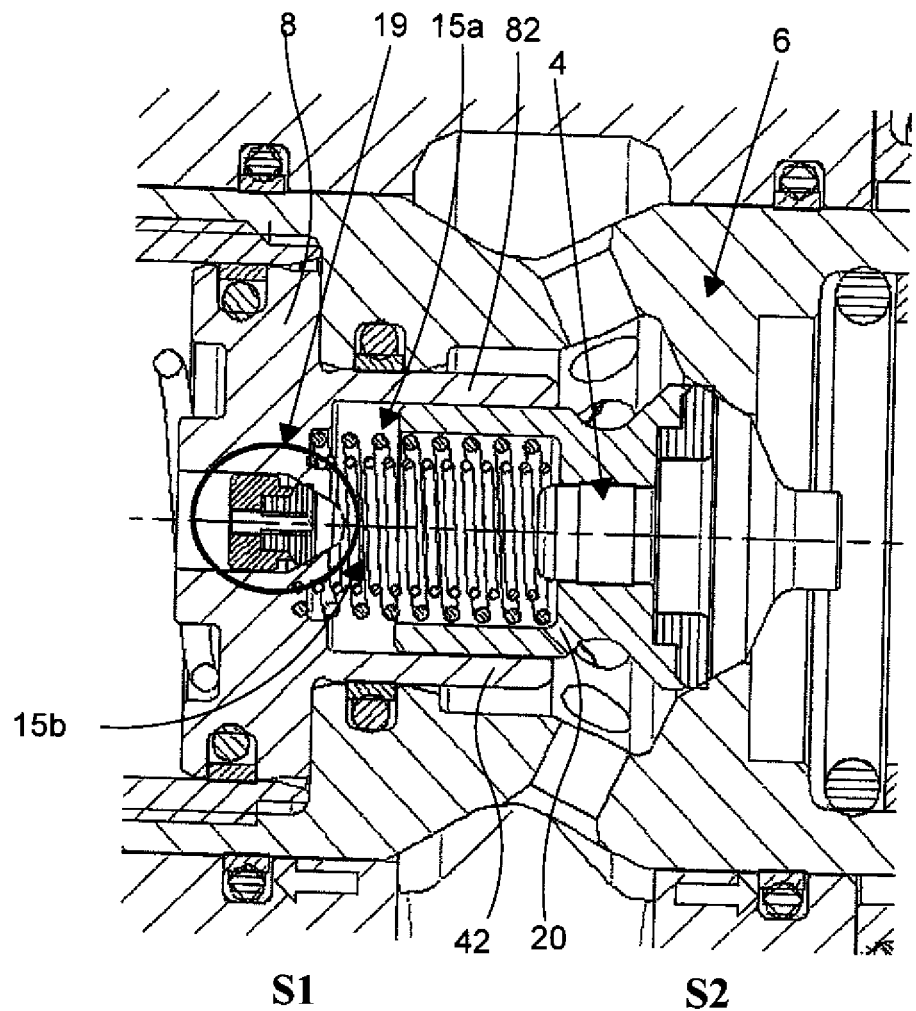
FIG. 4 shows an enlarged view of the detail indicated by letter C in FIG. 1, i.e. a detail of the balancing means.
Figure 5:
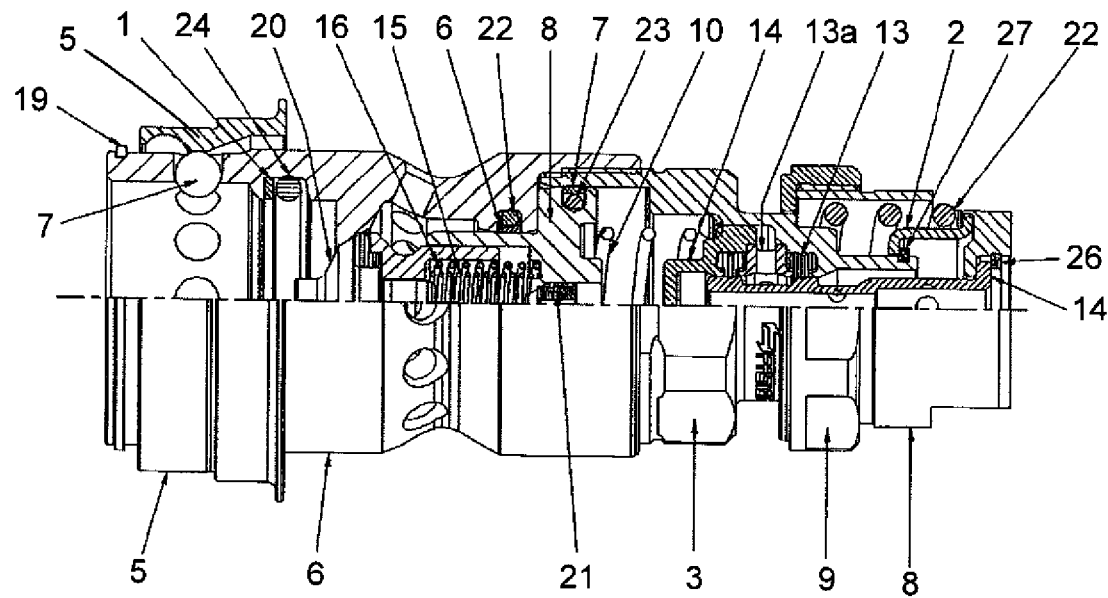
FIG. 5 shows the partial longitudinal section of the cartridge coupling in FIG. 1 without the external housing.

The decompression valve 16 allows the pressure inside the female semi-coupling 3 to be discharged without the need for intervention by the operator, both in the step of coupling and in the step of uncoupling the male semi-coupling 50. In fact, said balancing slider 8 comprises an internal valve assembly 19 in an axial position, longitudinally movable with respect to said balancing slider 8 as better shown in the detail in FIG. 4, and capable of allowing the pressurized fluid to pass towards chamber 15.

Another peculiarity of the cartridge coupling according to the present invention consists of the positioning of the resetting spring 22 in the rear area of the female semi-coupling 3, in particular behind the rear body 11 which is longitudinally blocked by a special screw 99A which permits to reset the female semi-coupling.

The operation of the cartridge coupling device according to the present invention will now be described again with reference to the accompanying figures.

With reference to FIG. 6, the step of coupling the male semi-coupling 50 with the female semi-coupling 3 occurs with a single continuous manoeuvre due to the sliding ring nut 5 adapted to provide a push-pull function, i.e. to allow the male semi-coupling 50 to be simply coupled and uncoupled by means of a pushing or pulling action on the male.

The coupling travel occurs with a single continuous manoeuvre. In the first attachment step, the male part pushes on the balls 7 of the ball set 6 which axially translates, thus moving back as pushed by the male until the balls 7 are inserted in specific grooves provided on the external surface of the male semi-coupling 50, as shown in FIG. 6. The ball set 6 determines the opening of the decompression valve 16 in its travel.

In the configuration in FIG. 6, the male semi-coupling 50 is inserted into the female semi-coupling 3 but it still has the valve 51 closed as in the male there is the pressurized fluid, while the pressure in the female has been moderated due to the opening of the decompression valve 16. When the male semi-coupling 50 is inserted into the female semi-coupling 3, the ball set 6 moves back, as mentioned, and while moving back, also causes the rear body 11 and the balancing slider 8 to move back. The rear body 11 moving back causes the decompression valve 16 of the female semi-coupling 3 to open. Thereby, the pressure in chamber 15 begins to discharge, and as the pressure decreases the internal valve assembly 19 opens, thus allowing the input fluid pressure in the female coupling through the calibrated hole 20 to be further discharged through the decompression valve 16.

Therefore, the operation of coupling the male semi-coupling 50 may be completed as shown in FIG. 6, without any intervention by the operator, due to the pressure in the female semi-coupling 3 being discharged.

The configuration in FIG. 6 shows a complete connection with the male subject to internal pressure being completely coupled, and the pressure discharged in the female semi-coupling 3 allows the valve assembly 4 to be moved back, i.e. the opening of the valve of the female semi-coupling 3 due to the overtravel of the balancing slider 8.

The valve assembly 4, pushed by the valve 51 of male 50, moves back by performing the overtravel until the balls 7 of the female find the male groove; at this point, by releasing the male semi-coupling, the resetting spring 22 is triggered and pushes the rear body 11 and the ball set 6 forward, as these are threaded with each other.

The axial translation of the rear body 11 closes the decompression B as the decompression rod 14 is blocked to the rear bowl 99—which is in turn threaded with the spacer 99B—by the ring 18a, the whole being fixed to the block (cast iron) by means of the special fixing screw 99A.

At this point, the male is coupled with the closed valve as shown in FIG. 6.

At this point, the decompression valve is closed, therefore the pressure which fills chamber 15 helps spring 10 push the balancing slider 8 forward, i.e. towards the male 50. The balancing slider 8 in turn pushes the valve assembly 4 and, due to the diameter size of the balancing slider 8 as compared to the dimensions of the valve assembly 51 of the male semi-coupling 50, the valve of the male semi-coupling is opened and therefore the line is opened, even with lower fluid pressures in the female as compared to those in the male.

In particular, the quick cartridge coupling according to the present invention is sized so as to have a 3:1 ratio between the pushing action F2 exerted on the valve assembly 4, by means of balancing slider 8 and chamber 15, and the resistance force F1 exerted by the pressure acting on the valve body 51 of the male semi-coupling 50. The male semi-coupling 50 is coupled and the valve 51 is opened due to this size ratio even when there is fluid with very high pressures in the user line to which the male is connected.

Naturally, as mentioned, opening the decompression valve 16 allows the line to be discharged by means of the clean oil conduit and to be recovered into the hydraulic circuit.

As mentioned, the cartridge coupling according to the present invention provides a 3:1 balancing system of the forces acting on the valves of the female semi-coupling and of the male semi-coupling, so as to facilitate also the coupling of a male under pressure and without the need for any action by the operator to decrease the pressure in the female semi-coupling.

Said balancing is obtained by means of the suitable sizing of the diameter of the balancing slider 8, on the crown of which the pressure force acts due to the fluid in chamber 15 according to the arrows F2 in FIG. 6, and of the valve assembly 51 on the crown of which the fluid pressure acts according to the arrows indicated by F1, again in FIG. 6. By suitably sizing the thrusting crown of the balancing slider 8, a 3:1 ratio has been obtained of the thrust forces due to the fluid pressure in favour of the thrust acting on the valve assembly 4 of the female semi-coupling. This balancing facilitates opening the valve assembly 51 of the male when the male semi-coupling is under pressure.

Therefore, due to their sizing, chamber 15 and balancing slider 8 are the hydraulic blocking means as they prevent obstructions and/or fluid passageway reductions even in the presence of sudden flow variations.

The step of disconnecting the male semi-coupling 50 from the female semi-coupling 3 occurs with a single continuous pulling manoeuvre on the male, as shown in FIGS. 8 to 11. The operation of the sliding ring nut 5 which may axially translate while keeping the male coupling blocked, by means of the forces exerted by the pressure affecting the crown of balls 7, permits the decompression in the rear area, with the coupling still being attached.

Figure 10:
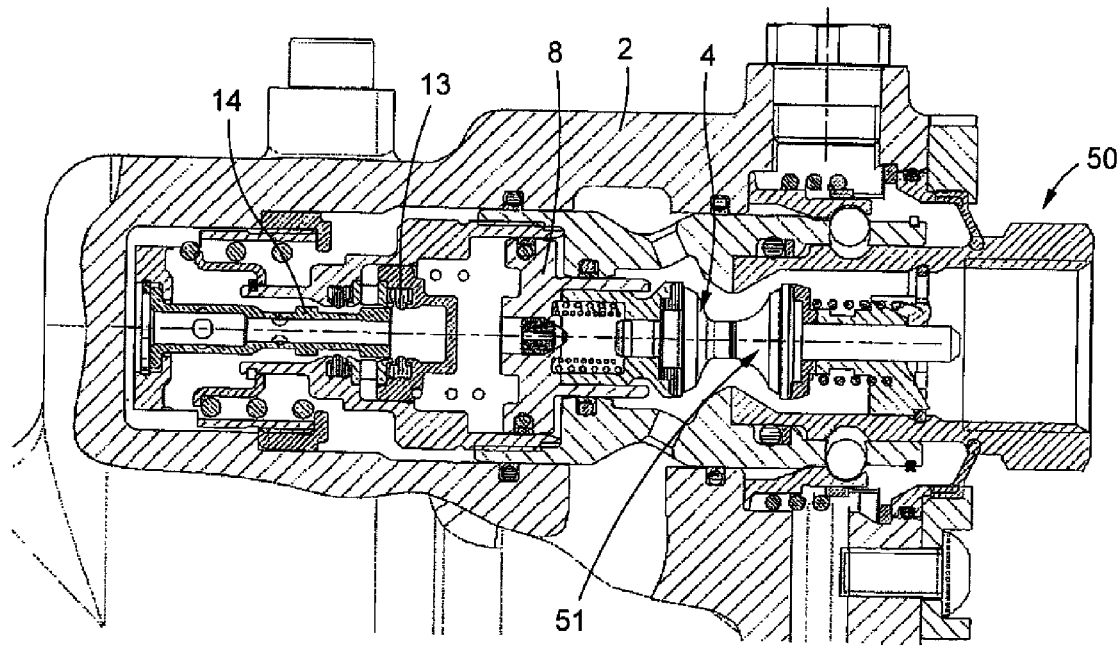
Figure 11:
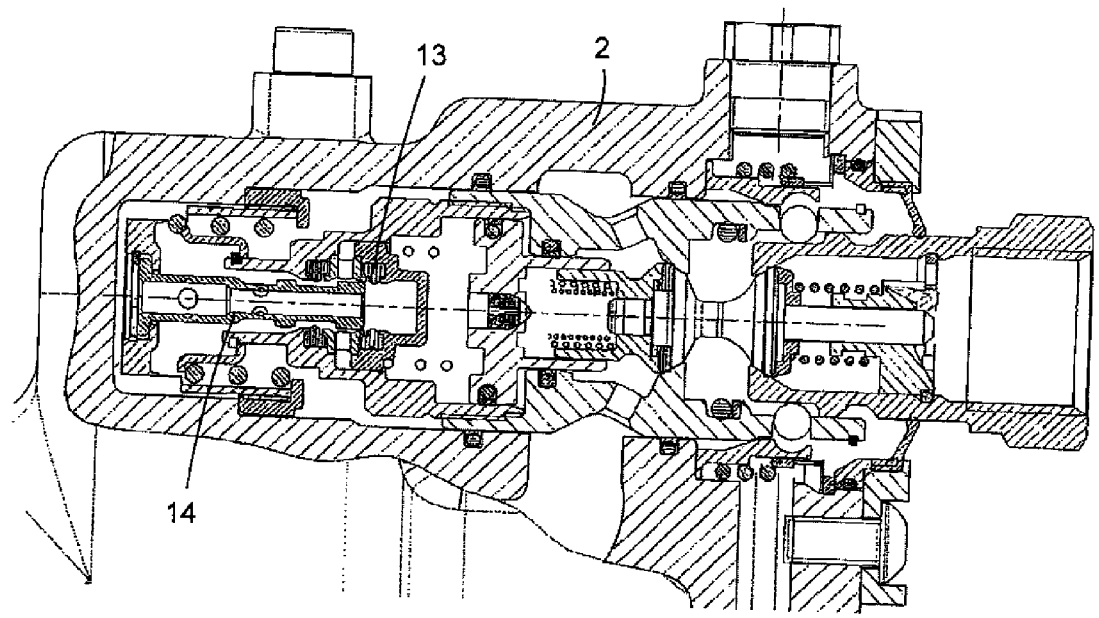

In fact, as shown in FIG. 10, since the gaskets 13 no longer seal, they let the fluid through thus moderating the pressure within the system.

Figure 3:
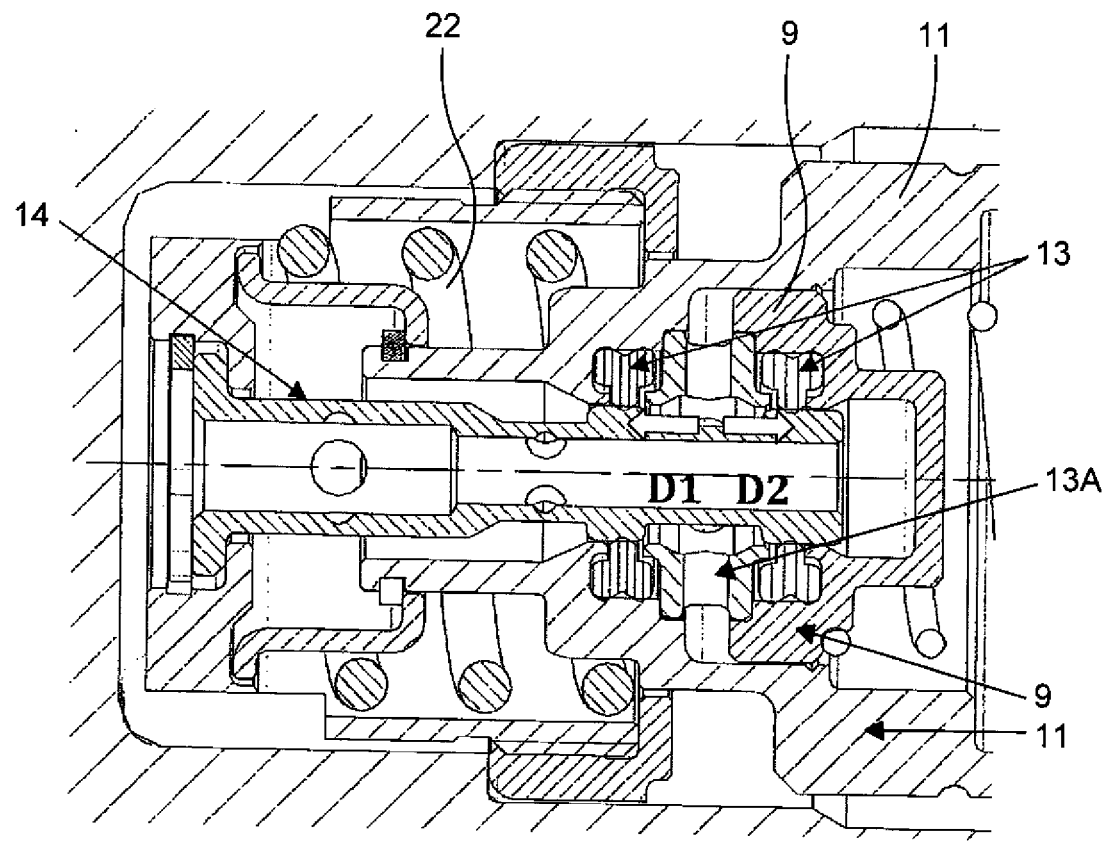
FIG. 3 shows an enlarged view of the detail indicated by B in FIG. 1, i.e. a detail of the decompression means.

By continuing the axial disconnection manoeuvre, the sliding ring nut 5 abuts on spacer 81 thus permitting the balls 7 to be housed inside specific grooves provided on the ring sliding nut, as shown in FIG. 3, and the male semi-coupling to be released from the related female part.

Spring 82 permits the repositioning of the sliding ring nut 5 and the resetting spring 22 repositions the body of the female semi-coupling in the initial position.

It has thus been shown how the cartridge coupling according to the present invention, characterized by a compact design and having smaller dimensions which permit the arrangement thereof in narrow spaces, allows the above-set task and objects to be achieved.

In particular it has been shown how the cartridge coupling according to the present invention allows the coupling and uncoupling loads to be reduced, thus facilitating the coupling and uncoupling operations even when there is pressurized fluid in the line, regardless of whether the pressurized fluid is in the male semi-coupling or in the female semi-coupling.

Again, the cartridge coupling according to the present invention allows a male to be inserted when there is pressurized fluid in the latter, and the male to be disconnected while leaving it under pressure.

Not last object achieved by the cartridge coupling according to the present invention is the possibility of coupling and uncoupling the male semi-coupling by means of a push-pull function by simply pushing or pulling.

Several modifications may be made by the person skilled in the art without departing from the scope of protection of the present invention.

Hence, the scope of protection of the claims should not be limited by the disclosures or preferred embodiments shown in the description by way of example, but rather the claims should comprise all features of patentable novelty inferable from the present invention, including all features which would be treated as equivalent by the person skilled in the art.

What is claimed is:

1. A cartridge coupling adapted to connect a pressurized fluid line between a vehicle or apparatus and a user, comprising an external housing within which a female semi-coupling is inserted, comprising a front valve assembly and adapted to receive a male semi-coupling being also equipped with a valve assembly, said housing comprising a fluid channel adapted to accommodate oil and decompression means, on said female semi-coupling, to moderate the pressure inside the line thus facilitating the operations of coupling and uncoupling the male semi-coupling to/from said female semi-coupling, said decompression means comprising a decompression valve placed in a substantially axial position at the end opposite to said female semi-coupling with respect to the front valve assembly and adapted to discharge the oil in said fluid channel, and further comprising a rear body, which is internally hollow and in which a balancing slider is housed, slidingly associated therewith, wherein a chamber adapted to be filled with pressurized fluid during the coupling operation is inside said rear body, being closed on one side by said balancing slider slidingly associated with said rear body, and in that said valve assembly has an inner cavity and is coaxial to said balancing slider and slidingly associated therewith, said balancing slider comprising an internal valve assembly in an axial position, adapted to put said chamber in communication with said inner cavity of said valve assembly.

2. A cartridge coupling according to claim 1, further comprising an internally hollow ball set capable of translating with respect to said housing and integral with said rear body.

3. A cartridge coupling according to claim 2, wherein said valve assembly is pushed to close the internal fluid passageway clearance of the female semi-coupling by the action of a first spring acting on said balancing slider placed behind said valve assembly.

4. A cartridge coupling according to claim 3, wherein said valve assembly comprises a calibrated hole adapted to put the inner cavity of said valve body in communication with the exterior.

5. A cartridge coupling according to claim 1, wherein said decompression valve comprises a decompression rod and a pair of shaped gaskets, said gaskets being separated from each other by a spacer adapted to ensure the fluid passing, said gaskets making the seal between said decompression rod and said inner body and/or said rear body, respectively.

6. A cartridge coupling according to claim 5, further comprising a balancing sliding bowl slidingly associated with the exterior of said rear body and the longitudinal travel of which is limited by a first elastic blocking ring.

* * * * *